Dec. 9, 1958 E. J. CASPER 2,863,459
INSTRUMENT FOR HOLDING SURGICAL NEEDLE
Filed May 29, 1956
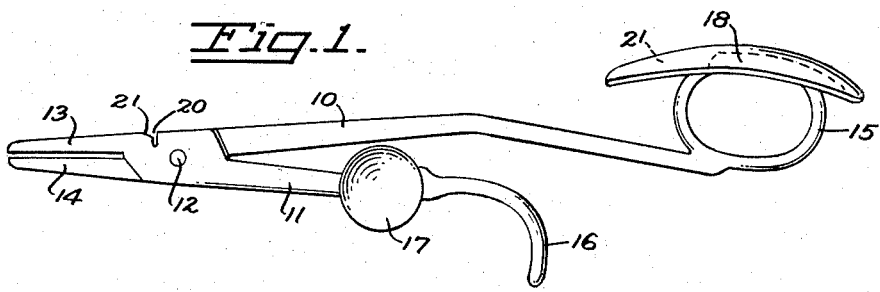
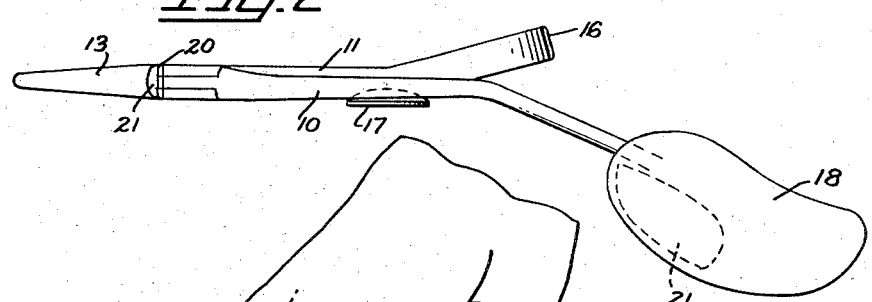
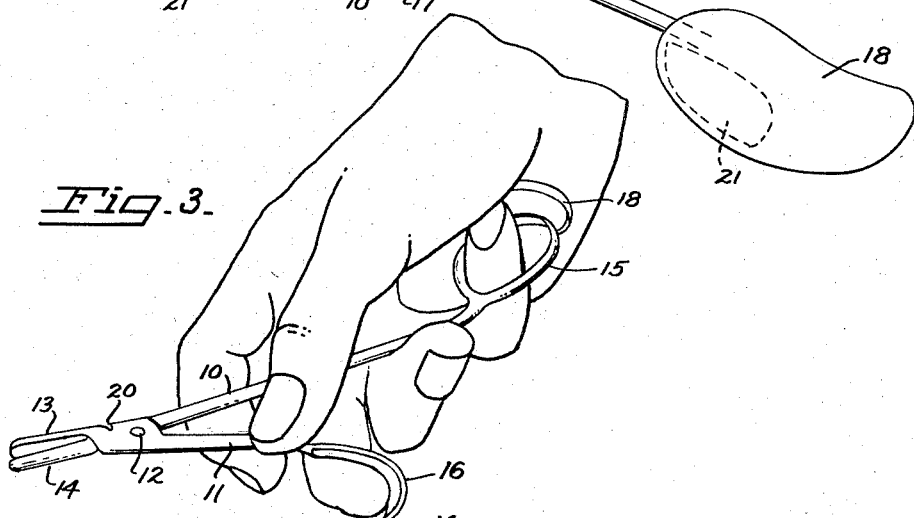
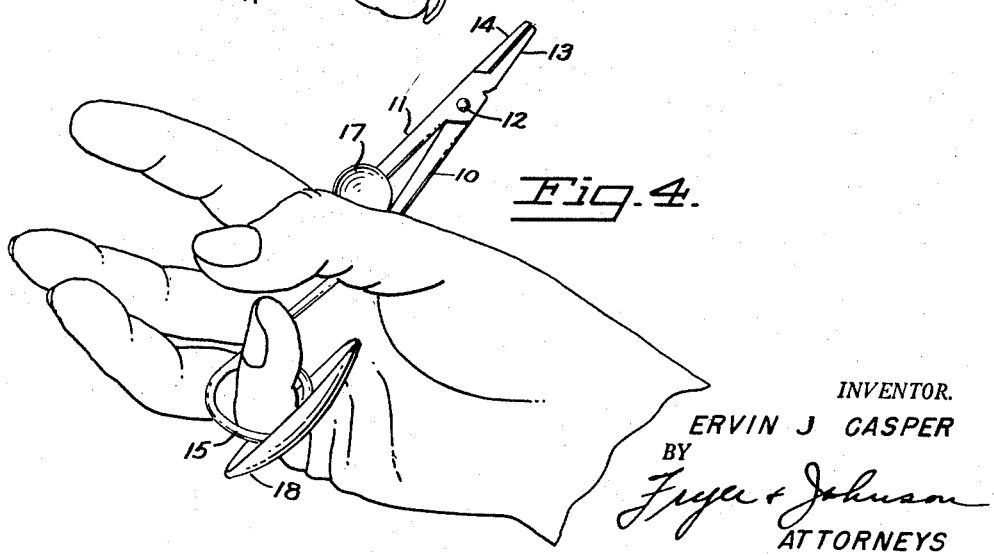
INVENTOR.
ERVIN J CASPER
BY
ATTORNEYS

2,863,459
INSTRUMENT FOR HOLDING SURGICAL NEEDLE

Ervin J. Casper, Vallejo, Calif.

Application May 29, 1956, Serial No. 588,163

3 Claims. (Cl. 128—321)

This invention relates to surgical instruments and particularly to improvements in forceps employed by surgeons in handling a surgical needle.

The forceps now employed in surgery are in the form of pincers which may be used to grasp a surgical needle and having the usual handles with finger loops or openings for the reception of the thumb and one finger. In closing a wound with a suture, it is often necessary to make a tie after each stitch. The surgeon must therefore lay aside the forceps after each stitch to free his thumb and fingers for knotting or tying the suture.

It is the object of the present invention to provide an improved instrument for holding a surgical needle which may be held in the hand in such a manner that the thumb and fingers are free for tying purposes.

A further object is to provide cutting means for severing the suture material and means for holding the needle in place so that the instrument may remain in the hands of the user throughout the entire time required for making and tying several separate stitches.

Further objects and advantages of the invention and the manner in which it is carried into practice are made apparent in the following specification where reference is made to the accompanying drawings illustrating the invention in a preferred form.

In the drawings:

Fig. 1 is a view in side elevation of an instrument embodying the present invention;

Fig. 2 is a plan view of the same instrument;

Fig. 3 is a view of the instrument held in the human hand in position to grasp a surgical needle and employ the needle for making a stitch; and Fig. 4 is another view of the instrument held in the human hand illustrating the position in which the instrument is held while the surgeon makes a knot using the same hand.

Referring to the drawings in detail, Figs. 1 and 2 show a surgical instrument such as forceps which have conventional crossed levers 10 and 11 pivotally connected intermediate their ends as at 12 and having at their forward ends an upper jaw 13 and a lower jaw 14.

In conventional forceps, the rear portion or handles of the levers 10 and 11 are provided, in the manner of an ordinary pair of scissors, with finger loops, one of which is here shown at 15 on the lever 10. According to the present invention, the lower lever 11 has no such finger loop but is shorter and has a curved finger rest 16 and a cooperating concave thumb plate 17. The finger loop 15 has secured to it a palm plate 18 and the lever 10 is bent intermediate its ends as illustrated slightly downwardly and inwardly to facilitate holding and manipulating the instrument in the manner now to be described.

For using the instrument to grasp and manipulate the surgical needle in the act of closing a wound, it is held in the manner illustrated in Fig. 3 with the palm plate 18 resting against the palm of the hand and held in place by the little finger which passes through the finger loop 15. The third finger falls naturally below the lever 10 as illustrated in Fig. 3 while the second finger occupies the finger rest 16. The thumb and first finger are employed to grasp and manipulate the lever 11, the end of the thumb fitting within the concave thumb plate 17 which is not shown in Fig. 3. This provides a grasp which is even more convenient than that afforded by ordinary forceps and the curved surgical needle is held between the jaws 13 and 14 and used in the usual manner for piercing the tissue and drawing the attached suture therethrough. A continuous stitch may be made in the conventional manner. However, when it is necessary to tie and cut, or as in many cases where interrupted stitches are made with a tie and cut after each stitch, it is not necessary with the instrument of the present invention for the surgeon to set it aside, cut the suture with a separate instrument and then set that instrument aside and make a tie.

With the instrument of this invention, the surgeon simply swings or tosses the instrument backwardly or toward himself to the position illustrated in Fig. 4 with the little finger still occupying the loop 15 and with the levers or handle portions of the instrument occupying the web or crotch between the thumb and first finger. This leaves the thumb and first three fingers free to manipulate the suture material in tying the necessary knot while the instrument may again and quickly be swung to the Fig. 3 position for taking the next stitch.

It is desirable that the needle remain in the forceps while they are in the Fig. 4 position and to accomplish this the upper jaw 13 is magnetized so that the needle remains in place while the knot is being tied.

To enable cutting of the suture with the same instrument, the invention includes registering notches 20 in the two levers on the upper side just in advance of the pivot 12 as illustrated in Figs. 1 and 2. In fact a slight incline 21 may be provided contiguous to the notches to facilitate entry of the suture into them. Since the notches 20 are continuous through both levers opening of the forceps effects a shearing action which cuts the suture material. It is found that some weight near the end of the handle portion 10 is desirable to facilitate swinging of the instrument from the position of Fig. 3 to the position of Fig. 4 and to this end an enlarged or thickened portion is provided on the concave side of the palm plate at the position indicated in dotted lines in Figs. 1 and 2 at 21.

With the instrument of the present invention, the surgeon may stitch, tie and cut without setting the instrument aside, thus reducing the time required in closing a wound and making more efficient the entire operation which was heretofore performed with several instruments employed alternately or in succession.

I claim:

1. In a forceps for surgical use having the usual crossed levers forming a jaw end and a handle end, a finger loop for the reception of the little finger on the handle end of one lever, the other lever being shorter than the first and having means to facilitate its manipulation by the thumb and first finger, said means including a concave plate positioned for the reception of the thumb while said finger loop is held in the palm of the hand.

2. In a forceps for surgical use having the usual crossed levers forming a jaw end and a handle end, a finger loop for the reception of the little finger on the handle end of one lever, the other lever being shorter than the first and having means to facilitate its manipulation by the thumb and first finger, said means including a concave plate for the reception of the thumb, and a finger rest for the reception of the second finger said plate and rest being positioned for reception of the thumb and second finger while said finger loop is held in the palm of the hand.

3. In a forceps for surgical use having the usual crossed levers forming a jaw end and a handle end, a finger loop for the reception of the little finger on the handle end of one lever, the other lever being shorter than the first and having means to facilitate its manipulation by the thumb and first finger, and a palm plate adjacent the finger loop on the first lever to rest in the palm of the hand while the little finger is in place in the loop.

References Cited in the file of this patent

UNITED STATES PATENTS

| | | |
|---|---|---|
| 440,436 | Pearsall | Nov. 11, 1890 |
| 699,832 | Broadbrooks | May 13, 1902 |
| 889,346 | Thomassen | June 2, 1908 |
| 1,967,549 | Buda | July 24, 1934 |
| 2,669,991 | Curutchet | Feb. 23, 1954 |
| 2,669,993 | Curutchet | Feb. 23, 1954 |

FOREIGN PATENTS

| | | |
|---|---|---|
| 380,736 | France | Oct. 17, 1907 |